United States Patent
Fujii et al.

(10) Patent No.: US 9,866,786 B2
(45) Date of Patent: Jan. 9, 2018

(54) DISPLAY APPARATUS

(71) Applicant: FUJI XEROX CO., LTD., Tokyo (JP)

(72) Inventors: Akira Fujii, Yokohama (JP); Suresh Murali, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/217,362

(22) Filed: Jul. 22, 2016

(65) Prior Publication Data

US 2017/0264854 A1    Sep. 14, 2017

(30) Foreign Application Priority Data

Mar. 8, 2016  (JP) ................. 2016-044906

(51) Int. Cl.
```
H04N 5/92      (2006.01)
H04N 5/775     (2006.01)
H04N 5/77      (2006.01)
H04N 5/76      (2006.01)
H04N 7/01      (2006.01)
G06T 3/40      (2006.01)
G06T 7/00      (2017.01)
```
(52) U.S. Cl.
CPC .............. H04N 5/77 (2013.01); G06T 3/40 (2013.01); G06T 7/004 (2013.01); H04N 5/76 (2013.01); H04N 7/0127 (2013.01)

(58) Field of Classification Search
CPC .......... H04N 5/77; H04N 5/76; H04N 7/0127; G06T 3/40; G06T 3/004
USPC ................ 386/230, 231, 235, 248, 323, 326
See application file for complete search history.

(56) References Cited

U.S. PATENT DOCUMENTS

| | | |
|---|---|---|
| 7,188,352 B2 * | 3/2007 | Nathan ............... G06Q 20/027 434/307 A |
| 9,253,229 B1 | 2/2016 | Strothmann et al. |
| 2005/0066089 A1 | 3/2005 | Karaoguz et al. |
| 2013/0195204 A1 | 8/2013 | Reznik et al. |
| 2013/0308919 A1 | 11/2013 | Shaw et al. |

FOREIGN PATENT DOCUMENTS

| | | |
|---|---|---|
| CN | 101848382 A | 9/2010 |
| EP | 1843592 A1 | 10/2007 |
| JP | 2004-088480 A | 3/2004 |
| JP | 2006-148789 A | 6/2006 |
| WO | 2006-097872 A2 | 9/2006 |

OTHER PUBLICATIONS

Feb. 9, 2017 Partial Search Report issued in European Patent Application No. 16186782.5.
May 4, 2017 extended European search report issued in European Patent Application No. 16186782.5.

* cited by examiner

Primary Examiner — Robert Chevalier
(74) Attorney, Agent, or Firm — Oliff PLC

(57) ABSTRACT

A display apparatus includes a temporary storage unit that temporarily stores data of a video that is delivered in a streaming manner, a display unit that displays the video while reading the data that is temporarily stored, and a processing unit that performs a storage amount control process such that a temporary storage amount of the data of the video stored in the temporary storage unit is an amount according to a state of the display apparatus displaying the video.

5 Claims, 13 Drawing Sheets

| SIZE OF DISPLAY REGION | RANGE OF BIT RATE (UNIT: Mbps) |
|---|---|
| LESS THAN THRESHOLD Th1 | 2.0、1.0、0.5、0.3 |
| EQUAL TO OR GREATER THAN THRESHOLD Th1 AND LESS THAN THRESHOLD Th2 | 4.0、2.0、1.0、0.5 |
| EQUAL TO OR GREATER THAN THRESHOLD Th2 | 4.0、2.0、1.0 |

FIG. 8

| STATE OF SIZE OF DISPLAY REGION || NUMBER OF PIECES OF SEGMENT DATA |
|---|---|---|
| | TEMPORARY STORAGE AMOUNT | |
| ENLARGED STATE | EQUAL TO OR LESS THAN UPPER LIMIT | INCREASE |
| | EXCEEDING UPPER LIMIT | ZERO |
| REDUCED STATE || DECREASE |

| STATE OF DIRECTION OF OWN APPARATUS | NUMBER OF PIECES OF SEGMENT DATA |
|---|---|
| HORIZONTAL DIRECTION | INCREASE |
| VERTICAL DIRECTION | DECREASE |

| STATE OF MOVING SPEED OF OWN APPARATUS | NUMBER OF PIECES OF SEGMENT DATA |
|---|---|
| LESS THAN THRESHOLD Th11 | INCREASE |
| EQUAL TO OR GREATER THAN THRESHOLD Th11 | DECREASE |

| STATE OF POSITION OF OWN APPARATUS | | NUMBER OF PIECES OF SEGMENT DATA |
|---|---|---|
| HOUSE/OFFICE | | INCREASE |
| MOVEMENT PATH | | DECREASE |
| ROUTE OF TRAIN | FROM DEPARTURE TO FRONT OF STATION | INCREASE |
| | FROM FRONT OF STATION TO DEPARTURE | DECREASE |

| CONNECTION DESTINATION OF RADIO COMMUNICATION | NUMBER OF PIECES OF SEGMENT DATA |
|---|---|
| ACCESS POINT | INCREASE |
| BASE STATION | DECREASE |

| CONNECTION OF PERIPHERAL | NUMBER OF PIECES OF SEGMENT DATA |
|---|---|
| ABSENCE | INCREASE |
| PRESENCE | DECREASE |

DISPLAY APPARATUS

CROSS-REFERENCE TO RELATED APPLICATIONS

This application is based on and claims priority under USC 119 from Japanese Patent Application No. 2016-044906 filed on Mar. 8, 2016.

BACKGROUND

Technical Field

The present invention relates to a display apparatus.

SUMMARY

According to an aspect of the invention, there is provided a display apparatus including: a temporary storage unit that temporarily stores data of a video that is delivered in a streaming manner; a display unit that displays the video while reading the data that is temporarily stored; and a processing unit that performs a storage amount control process such that a temporary storage amount of the data of the video stored in the temporary storage unit is an amount according to a state of the display apparatus displaying the video.

BRIEF DESCRIPTION OF DRAWINGS

Exemplary embodiments of the present invention will be described in detail based on the following figures, wherein:

FIG. 8 is a diagram that illustrates an example of a segment data number table.

DETAILED DESCRIPTION

[1] Exemplary Embodiment

Figure 1:
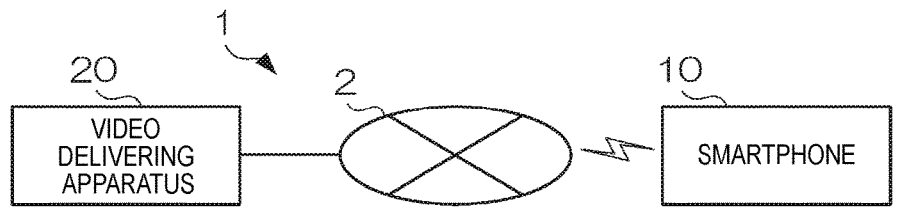
FIG. 1 is a diagram that illustrates the whole configuration of a video delivery system according to an exemplary embodiment.

FIG. 1 illustrates the whole configuration of a video delivery system 1 according to an exemplary embodiment. The video delivery system 1 is a system that delivers a video in a streaming manner to a playback apparatus used by a user. The streaming delivery of a video is delivery of a video using a structure dividing a video into plural segments and sequentially reproducing segment data while transmitting and receiving the segment data representing a video of each segment in a playback order. The segment data is data representing a segment, for example, of about one to ten seconds.

The video delivery system 1 includes: a communication line 2; a smartphone 10; and a video delivering apparatus 20. The communication line 2, for example, includes a mobile communication network, the Internet, and the like and is a system that relays the exchange of data between apparatuses. A smartphone 10 is connected to the communication line 2 in a wireless manner, and the video delivering apparatus 20 is connected to the communication line 2 in a wired manner (this is an example, and the connection may be made either in a wired manner or in a wireless manner).

The smartphone 10 is a display apparatus displaying a video that is delivered in a streaming manner in the video delivery system 1. The smartphone 10 is carried by a user and is used at various places. The video delivering apparatus 20 is an information processing apparatus that stores plural pieces of segment data representing one video as a whole and delivers the video in a streaming manner by sequentially transmitting such segment data in a playback order.

In the video delivery system 1, a video of which the bit rate can be varied during playback is delivered in a streaming manner, for example, in compliance with a standard called MPEG (Moving Picture Experts Group)-DASH (Dynamic Adaptive Streaming over HTTP). In the streaming delivery according to this exemplary embodiment, plural bit rates are set in advance.

Figure 2:
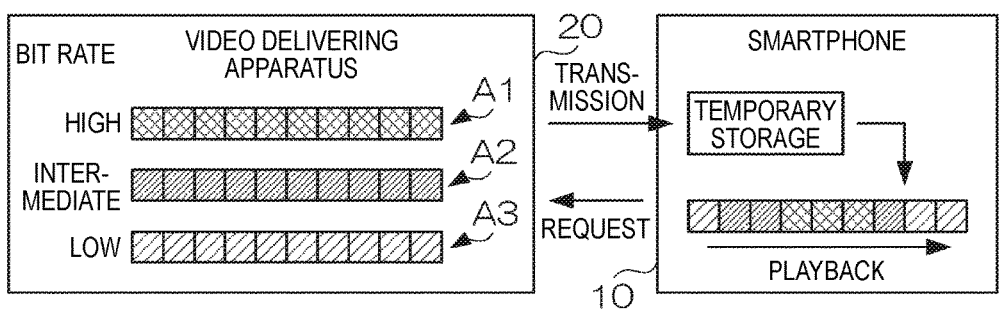
FIG. 2 is a diagram that illustrates the structure of streaming delivery.

FIG. 2 illustrates the structure of streaming delivery. The video delivering apparatus 20 according to this exemplary embodiment stores segment data groups A1, A2, and A3 respectively representing videos at "high", "intermediate", and "low" bit rates. A bit rate is the amount of data transmitted/received for one second (the unit is Mbps (mega bit per second) or MB/sec (megabytes per second). As the bit rate is higher, a video represented by such a segment data group has higher resolution or a higher frame rate of a video.

When requesting streaming delivery of a video, the smartphone 10 designates a bit rate of the video to be delivered. The video delivering apparatus 20 sequentially reads and transmits segment data from a segment data group of the designated bit rate. The smartphone 10 temporarily stores (caches) received segment data and reads and reproduces the cached segment data.

In addition, in a case where, during playback of a video, the smartphone 10 requests delivery with a bit rate different from that of the video which is played back, after the request is received, the video delivering apparatus 20 transmits segment data at a newly-designated bit rate. When the segment data is received, the smartphone 10, following the video represented by the segment data at the bit rate until now, plays back a video represented by segment data at a new bit rate. As above, the segment data groups A1, A2, and A3 represent a video of which plural segments are sequentially delivered in a streaming manner and of which the bit rate can be varied during playback.

Figure 3:
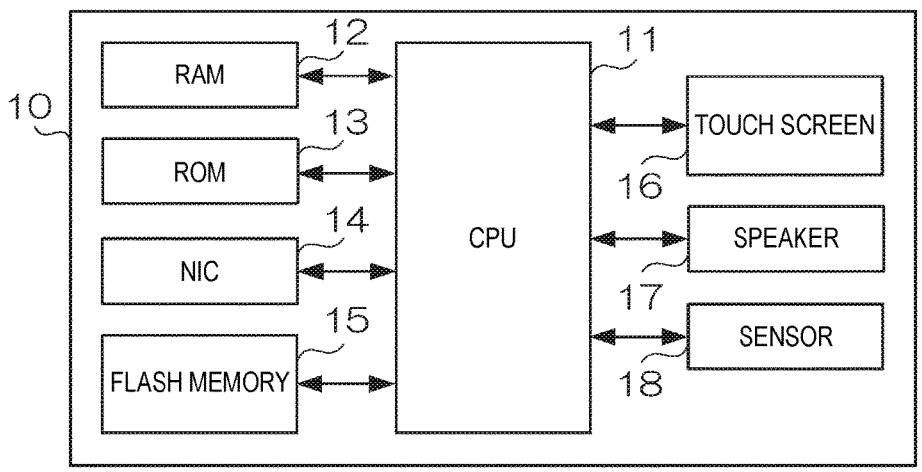
FIG. 3 is a diagram that illustrates the hardware configuration of a smartphone.

FIG. 3 illustrates the hardware configuration of the smartphone 10. The smartphone 10 is a computer that includes: a central processor unit (CPU) 11; a random access memory (RAM) 12; a read only memory (ROM) 13; a network interface card (NIC) 14; a flash memory 15; a touch screen 16; a speaker 17; and a sensor 18. The CPU 11 executes programs stored in the ROM 13 and the flash memory 15 with the RAM 12 used as a work area, thereby controlling the operation of each unit. The NIC 14 includes an antenna, a communication circuit, and the like and, for example, performs radio communication compliant with a mobile communication standard.

The flash memory 15 stores data and programs used by the CPU 11 for a control process. In this exemplary embodiment, a browser program is included in these programs. The function according to the present invention, which will be described later, is realized by a Java (registered trademark) script executed on the browser. However, the program is not limited thereto, but an application program realizing the function according to the present invention may be stored. The touch screen 16 includes a display that is a touch panel disposed on the surface of the display and receives a user's operation together with displaying an image. The speaker 17 converts sound data representing a sound into an analog signal and emits the sound. The sensor 18, for example, is a tri-axial geomagnetic sensor and supplies data representing the slope of the smartphone 10 to the CPU 11.

Figure 4:
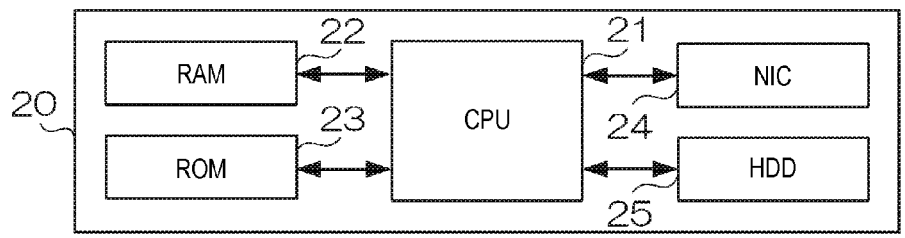
FIG. 4 is a diagram that illustrates the hardware configuration of a video delivering apparatus.

FIG. 4 illustrates the hardware configuration of the video delivering apparatus 20. The video delivering apparatus 20 is a computer that includes a CPU 21, a RAM 22, a ROM 23, an NIC 24, and a hard disk drive (HDD) 25. The CPU 21 to the ROM 23 are common to the hardware having the same names illustrated in FIG. 3. The NIC 24 includes a communication circuit and performs communication through the communication line 2. The HDD 25 stores data and programs used by the CPU 21 for a control process.

The CPU of each apparatus included in the video delivery system 1 controls each unit by executing a program, whereby functions described below are realized.

Figure 5:
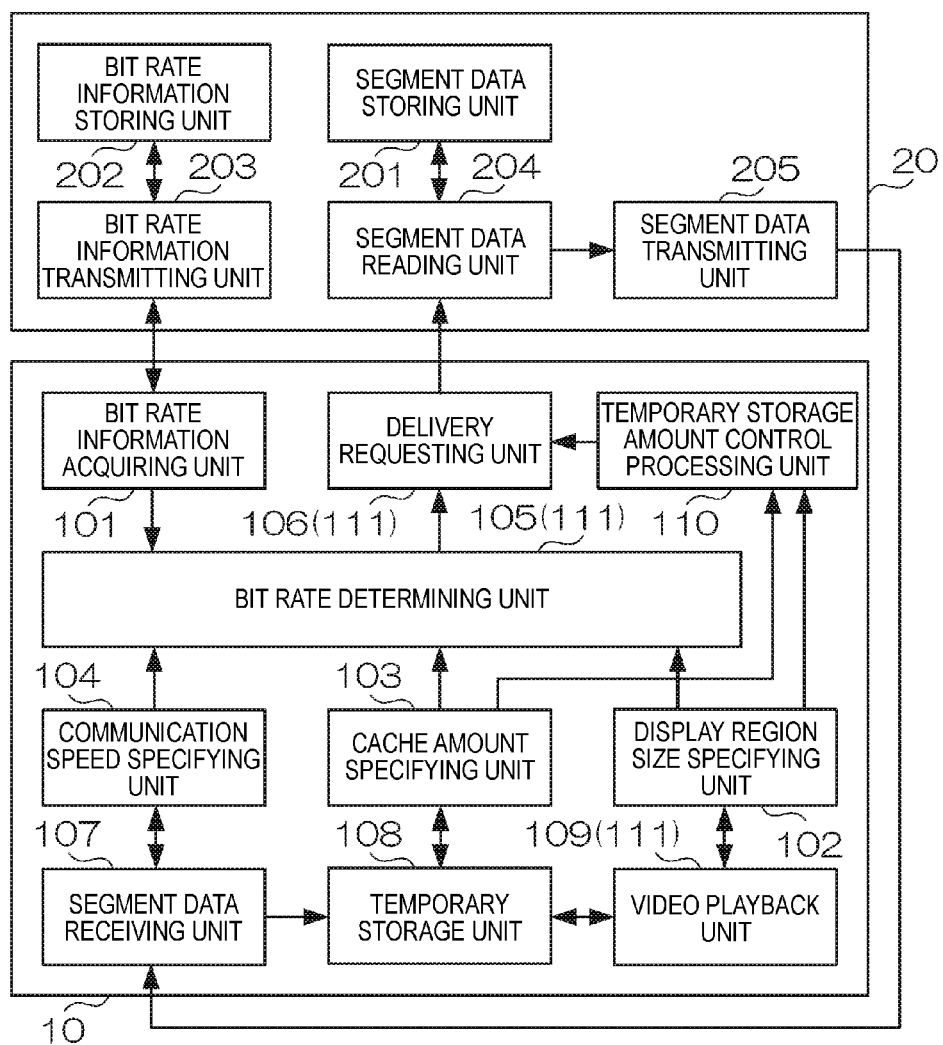
FIG. 5 is a diagram that illustrates the functional configuration realized by each apparatus.

FIG. 5 illustrates the functional configuration realized by each apparatus. The smartphone 10 includes: a bit rate information acquiring unit 101; a display region size specifying unit 102; a cache amount specifying unit 103; a communication speed specifying unit 104; a bit rate determining unit 105; a delivery requesting unit 106; a segment data receiving unit 107; a temporary storage unit 108; a video playback unit 109; and a temporary storage amount control processing unit 110. The video delivering apparatus 20 includes: a segment data storing unit 201; a bit rate information storing unit 202; a bit rate information transmitting unit 203; a segment data reading unit 204; and a segment data transmitting unit 205.

The segment data storing unit 201 of the video delivering apparatus 20 stores segment data of a video that is delivered in a streaming manner by the video delivering apparatus 20. The segment data storing unit 201, as described with reference to FIG. 2, stores segment data representing a video at plural bit rates. In order to decrease a communication amount, each segment data is encoded (compressed), for example, into data representing a difference between a reference frame and the current frame.

The bit rate information storing unit 202 stores bit rate information (for example, a media presentation description (MPD) in MPEG-DASH), which is stored in the segment data storing unit 201, representing plural bit rates of a video to be delivered in a streaming manner by the video delivering apparatus 20. The bit rate information storing unit 202, in the case of the example illustrated in FIG. 2, stores bit rate information representing bit rates of a video represented by the segment data groups A1, A2, and A3. This bit rate information is stored, for example, when segment data of a video is stored by an operator of the video delivering apparatus 20.

When requesting streaming delivery of a video, the bit rate information acquiring unit 101 of the smartphone 10 acquires bit rate information representing plural bit rates of the video. For example, in a case where a link to a video to be delivered in a streaming manner by the video delivering apparatus 20 is posted on a web page displayed by the smartphone 10, and a user performs an operation of selecting the link, the bit rate information acquiring unit 101 transmits request data requesting the bit rate information of the video to the video delivering apparatus 20. In this request data, information (for example, a uniform resource locator (URL) or the like of a file (an MPD file in MPEG-DASH)) specifying a video is included.

When the request data transmitted from the smartphone 10 is received, the bit rate information transmitting unit 203 of the video delivering apparatus 20 reads bit rate information of a video specified in the request data, in other words, a video stored in the video delivering apparatus 20 from the bit rate information storing unit 202 and transmits the read bit rate information to a request source (in this exemplary embodiment, the smartphone 10). The bit rate information acquiring unit 101 acquires the bit rate information transmitted in this way. The bit rate information acquiring unit 101 supplies the acquired bit rate information to the bit rate determining unit 105.

The bit rate determining unit 105 determines one of plural bit rates represented by the bit rate information acquired by the bit rate information acquiring unit 101 as a bit rate of the video to be played back. A method of determining the bit rate will be described later in detail. The bit rate determining unit 105 repeatedly performs the determination of a bit rate at a determined time interval. As the time interval, for example, an interval (for example, in a case where the determined number of pieces of segment data of which the playback time is two seconds is two, for every four seconds or the like) of playback time of a video that is represented by a determined number of pieces of segment data is used. Every time when the bit rate is determined, the bit rate determining unit 105 notifies the delivery requesting unit 106 of the determined bit rate.

The delivery requesting unit 106 requests an apparatus (in this exemplary embodiment, the video delivering apparatus 20), which performs streaming delivery of a video, to deliver the video at a bit rate determined by the bit rate determining unit 105 in a streaming manner. In a case where the bit rate determined by the bit rate determining unit 105 is varied, the bit rate of the video requested to be delivered in a streaming manner by the delivery requesting unit 106 is also varied.

In addition, the delivery requesting unit 106 performs this request with the number of pieces of segment data to be transmitted being designated. The delivery request performed by the delivery requesting unit 106 is performed every time when the bit rate determining unit 105 determines a bit rate. For this reason, as the number of pieces of segment data designated by the delivery requesting unit 106 increases, a video of a scene disposed on a further front side is delivered.

When streaming delivery of a video is requested from an external apparatus, the segment data reading unit 204 of the video delivering apparatus 20 reads segment data of the requested video. When designation data transmitted from the smartphone 10 is received, the segment data reading unit 204 reads segment data corresponding to a number designated in the designation data from a segment data group of a bit rate designated in the designation data from the beginning of the video.

Thereafter, the segment data reading unit 204 repeatedly performs a process of reading segment data corresponding to the designated number from the continuation of the segment data that has been read at an interval of a playback time of a portion of the video represented in the segment data read at one time or a time shorter than the playback time. When the designated bit rate is varied in the middle, the segment data reading unit 204 reads segment data corresponding to the designated number from a portion at which the playback position is continued among segment data of a new bit rate. Every time when the segment data is read, the segment data reading unit 204 supplies the read segment data to the segment data transmitting unit 205.

The segment data transmitting unit 205 transmits the supplied segment data to a transmission source (in this exemplary embodiment, the smartphone 10) of the designation data, in other words, a request source that has requested the streaming delivery of the video. The segment data receiving unit 107 of the smartphone 10 receives segment data that has been transmitted from the video delivering apparatus 20. The segment data receiving unit 107 supplies the received segment data to the temporary storage unit 108.

The temporary storage unit 108 temporarily stores data of a video that is delivered in a streaming manner. In more details, the temporary storage unit 108 temporarily stores segment data that is received by the segment data receiving unit 107 until a portion of the video that is represented by the segment data is reproduced.

When the segment data is stored in the temporary storage unit 108, the video playback unit 109 sequentially reads the stored segment data and sequentially plays back a video represented by the read segment data. As described above, since the segment data is encoded, the video playback unit 109 decodes the segment data and then reproduces the decoded segment data. While displaying the reproduced video in a display region, the video playback unit 109 displays the video in a different display region according to the direction of the smartphone 10.

Figure 6A:
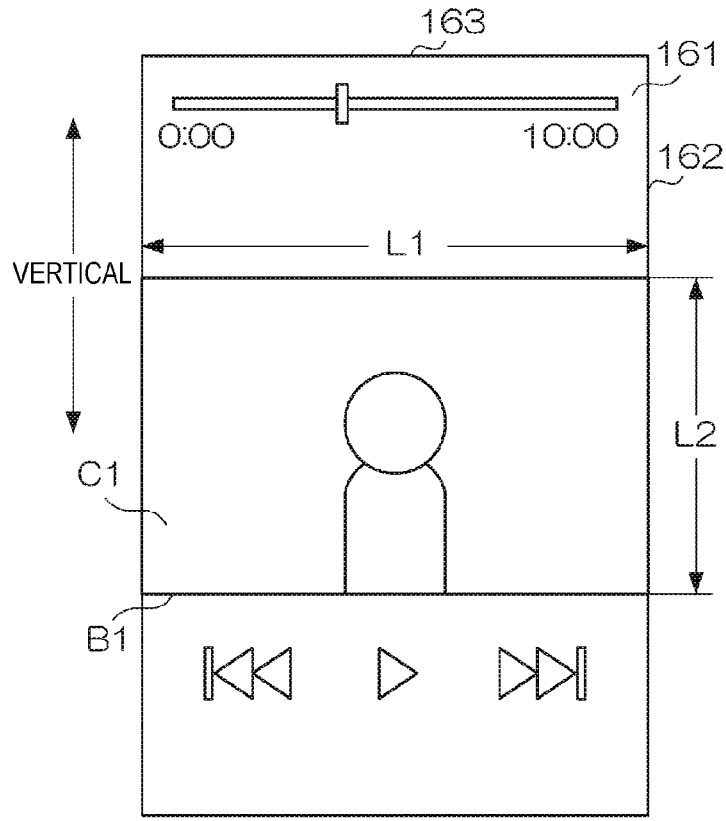
FIG. 6A is a diagram that illustrates an example of a video displayed in a display region.
Figure 6B:
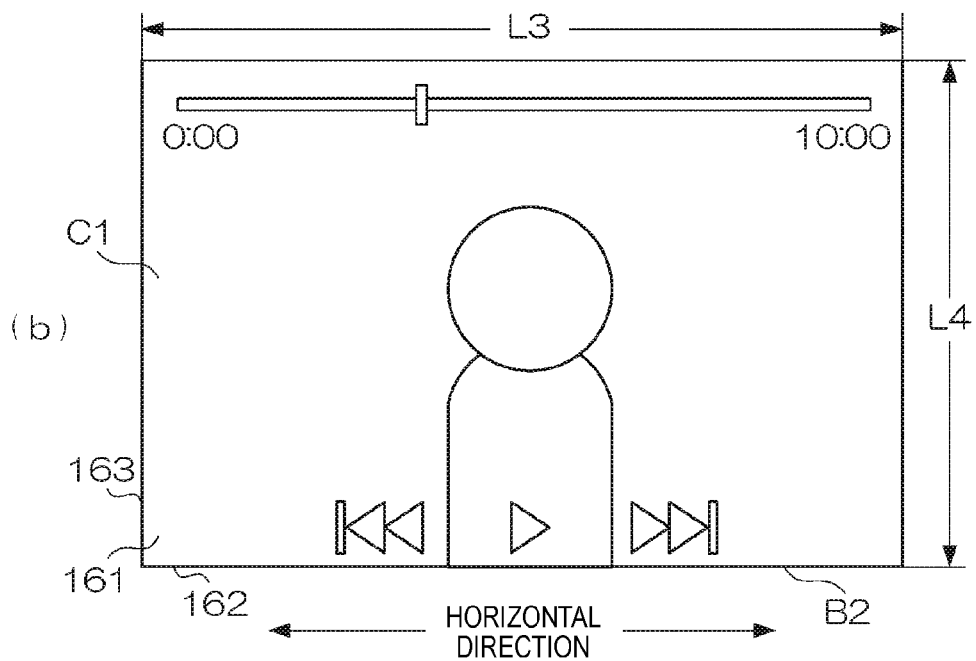
FIG. 6B is a diagram that illustrates an example of a video displayed in a display region.
Figures 6C, 7:
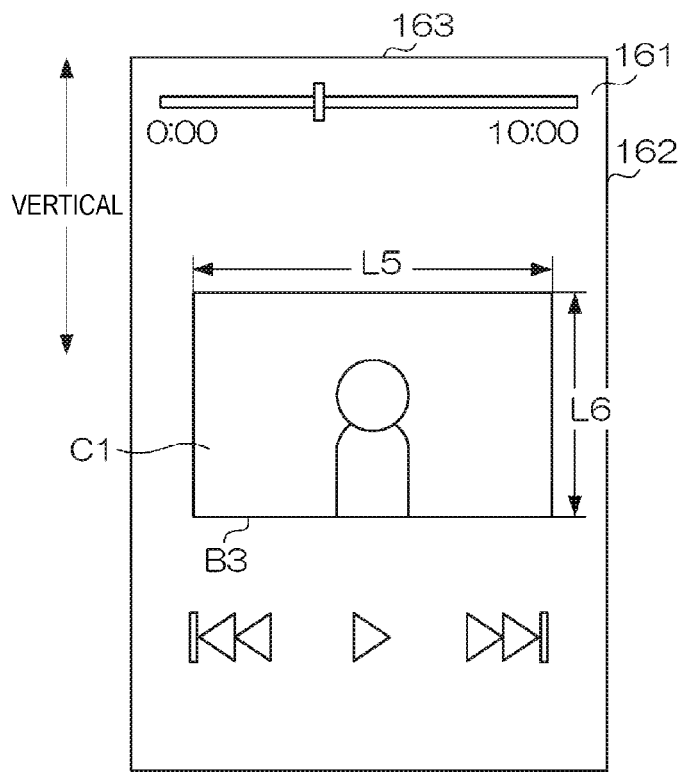
FIG. 6C is a diagram that illustrates an example of a video displayed in a display region.
FIG. 7 is a diagram that illustrates an example of a bit rate table.

FIGS. 6A, 6B and 6C are diagrams that illustrate examples of videos displayed in display regions. In the examples illustrated in FIGS. 6A, 6B and 6C, on a display surface 161 of the touch screen 16 illustrated in FIG. 2, videos are displayed. The display surface 161 is a rectangular surface surrounded by long sides 162 and short sides 163. In FIG. 6A, a display region B1 of a case where the smartphone 10 is directed (hereinafter, referred to as a "vertical direction") such that the long side 162 of the display surface 161 is disposed along the vertical direction is illustrated.

In FIG. 6B, a display region B2 of a case where the smartphone 10 is directed (hereinafter, referred to as a "horizontal direction") such that the long side 162 of the display surface 161 is disposed along the horizontal direction is illustrated. In both the display regions B1 and B2, a video C1 in which a person is shown is displayed. The video playback unit 109 determines whether the own apparatus (the smartphone 10) is disposed in the vertical direction or the horizontal direction based on the slope of the own apparatus that is measured by the sensor 18 illustrated in FIG. 3 and displays the video in the display region B1 in the case of the vertical direction and displays the video in the display region B2 in the case of the horizontal direction.

The display region size specifying unit 102 of the smartphone 10 specifies the size of the display region of a video that is delivered in a streaming manner. The display region size specifying unit 102 is an example of a "first specifying unit" according to the exemplary embodiment of the present invention. The display region size specifying unit 102 inquires the video playback unit 109 of the type (which one of the display regions B1 and B2) of display region in which the video is displayed. When the inquiry is received, the video playback unit 109 notifies the display region size specifying unit 102 of the type of display region in which the video is displayed. The display region size specifying unit 102 specifies a size corresponding to the notified type of display region as the size of the display region.

In a case where the display region B1 is notified as the type of display region, the display region size specifying unit 102 specifies a value acquired by multiplying the length L1 of a long side illustrated in FIG. 6A by the length L2 of a short side, in other words, the area of the display region as a size of the display region. On the other hand, in a case where the display region B2 is notified as the type of display region, the display region size specifying unit 102 specifies a value acquired by multiplying the length L3 of a long side illustrated in FIG. 6B by the length L4 of a short side, in other words, the area of the display region as a size of the display region.

Here, while the short side of the display region B1 is in contact with the long side 162 of the display surface 161, and the short side of the display region B2 is in contact with the short side 163 of the display surface 161, the size and the arrangement of the display region are not limited thereto. The video playback unit 109, for example, as illustrated in FIG. 6C may display the video C1 in a display region B3 having neither a long side nor a short side to be in contact with the long side 162 and the short side 163 of the display surface 161. Also in such a case, the display region size specifying unit 102 specifies a value acquired by multiplying the length L5 of the long side of the display region B3 by the length L6 of the short side thereof as a size of the display region. The display region size specifying unit 102 supplies size information (in this exemplary embodiment, information representing the area of the display region) representing the size of the display region specified as above to the bit rate determining unit 105 and the temporary storage amount control processing unit 110.

The cache amount specifying unit 103 of the smartphone 10 specifies a cache amount in streaming playback, in other words, a data amount of segment data that is temporarily stored for a position of the video, which is played back in a streaming manner, to be reproduced from now. The cache amount specifying unit 103 is an example of a "second specifying unit". The cache amount specifying unit 103 refers to the segment data that is temporarily stored in the temporary storage unit 108 and specifies a playback time of a case where the segment data that has been referred to is reproduced as the cache amount described above. For example, in a case where the cached segment data represents a video for two seconds, and the video corresponding to 0.5 seconds has already been reproduced, the cache amount specifying unit 103 specifies that a video corresponding to 1.5 seconds is cached and supplies information representing the number of seconds to the bit rate determining unit 105 and the temporary storage amount control processing unit 110 as cache amount information.

The communication speed specifying unit 104 of the smartphone 10 specifies a communication speed in reception of segment data of a video that is delivered in a streaming manner. The communication speed specifying unit 104 is an example of a "third specifying unit" according to the exemplary embodiment of the present invention. The communication speed specifying unit 104 monitors the segment data receiving unit 107 and specifies the data size of the segment data received by the segment data receiving unit 107 for a unit time as a communication speed. For example, in a case where segment data of 10 Megabits is received for one second, the segment data receiving unit 107 specifies 10 Mbps as a communication speed. The segment data receiving unit 107 supplies communication speed information representing the communication speed specified in that way to the bit rate determining unit 105.

The display region size specifying unit 102, the cache amount specifying unit 103, and the communication speed specifying unit 104 perform specific processes thereof at a time interval that is same as the time interval at which the bit rate determining unit 105 repeatedly determines the bit rate.

The bit rate determining unit 105 determines a bit rate of a video to be played back based on the size of the display region specified by the display region size specifying unit 102, the cache amount specified by the cache amount specifying unit 103, and the communication speed specified by the communication speed specifying unit 104. The bit rate determining unit 105, for example, uses a bit rate table in which the size of the display region and the range of the bit rate are associated with each other.

FIG. 7 illustrates an example of a bit rate table. In the example illustrated in FIG. 7, in streaming delivery, five bit rates including 4.0 Mbps, 2.0 Mbps, 1.0 Mbps, 0.5 Mbps, and 0.3 Mbps are set. In such a case, a range of the bit rate of "2.0, 1.0, 0.5, and 0.3) (the unit is Mbps) is associated with a size of the display region of "less than threshold Th1". In addition, a range of the bit rate of "4.0, 2.0, 1.0, and 0.5) is associated with a size of the display region of "equal to or more than threshold Th1 and less than threshold Th2", and a range of the bit rate of "4.0, 2.0, and 1.0) is associated with a size of the display region of "equal to or more than threshold Th2".

The bit rate determining unit 105 reads a range of the bit rate associated with a size of the display region that is specified by the display region size specifying unit 102 from the bit rate table. The bit rate determining unit 105 narrows down the read range of the bit rate into a range not exceeding the communication speed specified by the communication speed specifying unit 104. For example, in a case where the size of the display region less than threshold Th1 is specified, the bit rate determining unit 105 reads the range of the bit rate of "2.0, 1.0, 0.5, and 0.3". Then, in a case where a communication speed of 1.2 Mbps is specified, the bit rate of 2.0 Mbps exceeds the specified communication speed, and thus, the bit rate determining unit 105 narrows down the range of the bit rate into the other "1.0, 0.5, and 0.3".

In a case where a playback time (hereinafter, referred to as a "cache playback time") of a case where a video represented by segment data of which the cache amount specified by the cache amount specifying unit 103 is temporarily stored is reproduced is equal to or more than threshold Th3, the bit rate determining unit 105 selects one of bit rates up to a sequence determined from the highest bit rate in the narrowed-down range and determines the selected bit rate as the bit rate of the video. In this exemplary embodiment, the bit rate determining unit 105 selects and determines a bit rate of the determined sequence of up to "1", in other words, a maximum bit rate. As in the example described above, in a case where the narrowed-down range is "1.0, 0.5, and 0.3", the bit rate determining unit 105 determines "1.0" that is a maximum bit rate among these as the bit rate of the video to be played back.

On the other hand, in a case where the cache playback time is less than threshold Th3 described above, the bit rate determining unit 105 selects one of bit rates up to a sequence determined from the lowest bit rate in the narrowed-down range and determines the selected bit rate as the bit rate of the video to be played back. In this exemplary embodiment, a sequence including all the bit rates except for the maximum bit rate is determined Thus, the bit rate determining unit 105 selects and determines one of bit rates acquired by excluding the maximum bit rate from the narrowed-down range.

As in the example described above, in a case where the narrowed-down range is "1.0, 0.5, and 0.3", the bit rate determining unit 105 selects one of "0.5 and 0.3" acquired by excluding "1.0" that is a maximum bit rate among these and determines the selected bit rate as the bit rate of the video to be played back. In a case where one of two or more bit rates is finally selected, for example, the bit rate determining unit 105 may constantly select a maximum bit rate among them by placing more importance on the resolution of the video or may constantly select a minimum bit rate among them by placing more importance on the continuity of the video.

The bit rate determining unit 105 cooperates with the delivery requesting unit 106 and the video playback unit 109, thereby serving as a display unit 111 that displays a video while reading data of the video that is temporarily stored. The display unit 111, as described above, varies the bit rate of a video in accordance with the size of a display region in which the video is displayed. More specifically, the display unit 111 varies the bit rate to a large value in a case where the display region is increased and varies the bit rate to a small value in a case where the display region is decreased.

The temporary storage amount control processing unit 110 performs a storage amount control process for configuring a temporary storage amount of data of a video stored in the temporary storage unit 108 to be an amount according to the state of the own apparatus (the smartphone 10) displaying the video. The temporary storage amount control processing unit 110 is an example of a "processing unit" according to the exemplary embodiment of the present invention. In this exemplary embodiment, the temporary storage amount control processing unit 110 performs a process of configuring a temporary storage amount to be an amount according to the size by using a size state of a display region represented by the size information supplied from the display region size specifying unit 102 as an own apparatus state as the storage amount control process.

The temporary storage amount control processing unit 110 performs the determination described above by using a segment data number table in which the display region size state and the number of pieces of segment data are associated with each other.

FIG. 8 is a diagram that illustrates an example of the segment data number table. In the example illustrated in FIG. 8, it is represented that the number of pieces of segment data is "increased" in a case where the display region size state is an "enlarged state", and the temporary storage amount is in a state of being "equal to or less than an upper limit", and the number of pieces of segment data is set to "0" in a case where the display region size state is the "enlarged state", and the temporary storage amount is in a state of "exceeding the upper limit" On the other hand, it is represented that the number of pieces of segment data is "decreased" in a case where the display region size state is a "reduced state".

In the smartphone 10, there is an upper limit of the amount (temporary storage amount) of data of a video that is temporarily stored by the temporary storage unit 108. This upper limit, for example, is set and determined by a user so as to prevent an available capacity of the RAM from being small due to cached data and prevent processes other than the playback of a video from being delayed. In addition, also in a case where the cached amount is sufficiently smaller than the available capacity of the RAM, an upper limit of the temporary storage amount for securing a predetermined time or more for playback may be set.

For example, in a case where the own apparatus state is an enlarged state in which the size of the display region is enlarged, the temporary storage amount control processing unit 110 performs a process of increasing the temporary storage amount as the storage amount control process in a case where the temporary storage amount is equal to or less than the upper limit. In a case where the size of the display region represented by the size information supplied at this time is larger than the size of the display region represented by the size information supplied at the previous time, the temporary storage amount control processing unit 110 determines an enlarged state. The temporary storage amount control processing unit 110 determines the number of pieces of segment data requested by the delivery requesting unit 106 and performs an instructing process of giving an instruction for requesting segment data of the determined number as a storage amount control process.

In a case where the enlarged state is determined as described above, the temporary storage amount control processing unit 110 performs a determination of increasing the number of pieces of segment data as represented in the segment data number table. The temporary storage amount control processing unit 110 may increase the number of pieces of segment data from the previous number or may increase the number from a reference number (for example, the number of pieces of segment data reproduced at the interval at which a delivery request is made; in a case where the playback time of one segment data is two seconds, and the request interval is four seconds, the reference number of two) set in advance.

In any case, the number of pieces of segment data requested by the delivery requesting unit 106 is increased, segment data representing a further previous screen is transmitted, and the data amount of the segment data stored in the temporary storage unit 108, in other words, the temporary storage amount is increased. The temporary storage amount control processing unit 110 performs a process of increasing the temporary storage amount in a range up to the upper limit as a storage amount control process.

In a case where the amount (in this exemplary embodiment, the number of seconds of the cached video) represented by the cache amount information supplied from the cache amount specifying unit 103 arrives at an upper limit set in advance, also in a case where the display region size state is the enlarged state, the temporary storage amount control processing unit 110 determines the next number of pieces of segment data to be zero as represented by the segment data number table, whereby the temporary storage amount does not exceed the upper limit. In addition, the number of the pieces of segment data of this case is not limited to zero but may be a number for decreasing the temporary storage amount.

On the other hand, in a case where the own apparatus state is a reduction state in which the size of the display region is reduced, the temporary storage amount control processing unit 110 performs a process of decreasing the temporary storage amount as a storage amount control process. In a case where the size of the display region represented by the size information supplied at this time is smaller than the size of the display region represented by the size information supplied at the previous time, the temporary storage amount control processing unit 110 determines a reduced state.

In a case where the reduced state is determined, the temporary storage amount control processing unit 110 performs a determination of decreasing the number of pieces of segment data as represented in the segment data number table. The temporary storage amount control processing unit 110 may decrease the number of pieces of segment data from the number at the previous time or may decrease the number from the reference number set in advance as described above. In any case, the number of pieces of segment data requested by the delivery requesting unit 106 is decreased, and the data amount of the segment data stored in the temporary storage unit 108, in other words, the temporary storage amount is decreased.

Each apparatus included in the video delivery system 1 performs a streaming delivery process of a video based on the configuration described above.

Figure 9:
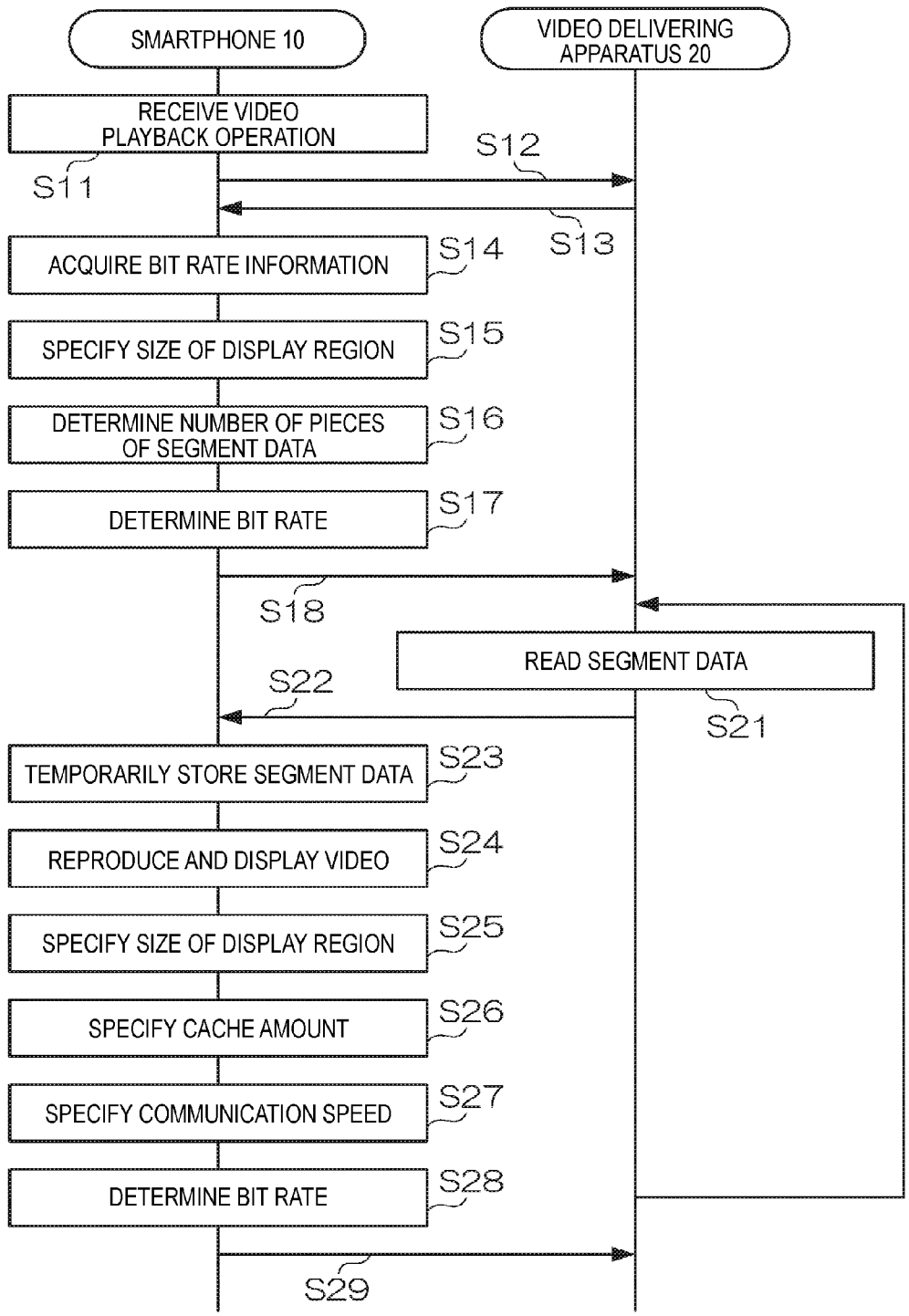
FIG. 9 is a diagram that illustrates an example of the operation sequence of each apparatus in a stream delivery process.

FIG. 9 illustrates an example of the operation sequence of each apparatus in a streaming delivery process. In the example illustrated in FIG. 9, the operation sequence is started by being triggered upon a user's operation (an operation of selecting a link to a video or the like) of playing back a video that is delivered in a streaming manner to the smartphone 10.

First, the smartphone 10 receives a playback operation of a video (Step S11). Next, the smartphone 10 (the bit rate information acquiring unit 101) requests the video delivering apparatus 20 for the bit rate information of the video of which the playback operation is received (Step S12). The video delivering apparatus 20 (the bit rate information transmitting unit 203) reads the requested bit rate information of the video and transmits the read bit rate information to the smartphone 10 (Step S13). The smartphone 10 (the bit rate information acquiring unit 101) acquires the bit rate information that has been transmitted thereto (Step S14).

Subsequently, the smartphone 10 (the display region size specifying unit 102) specifies the size of the display region of the video of which the playback operation has been received (Step S15). Next, the smartphone 10 (the temporary storage amount control processing unit 110) determines the number of pieces of segment data according to the specified size (Step S16). Subsequently, the smartphone 10 (the bit rate determining unit 105) determines a bit rate of the video according to the specified size (Step S17). Then, the smartphone 10 (the delivery requesting unit 106) requests the video delivering apparatus 20 to perform streaming delivery of the video at the bit rate determined in Step S17 (Step S18).

The video delivering apparatus 20 (the segment data reading unit 204) reads segment data representing the video of the bit rate requested in Step S18 (Step S21). Next, the video delivering apparatus 20 (the segment data transmitting unit 205) transmits the segment data read in Step S21 to the smartphone 10 (Step S22). The smartphone 10 (the segment data receiving unit 107) receives the segment data transmitted thereto in Step S22. The smartphone 10 (the temporary storage unit 108) temporarily stores the received segment data (Step S23).

Next, the smartphone 10 (the video playback unit 109) reads and reproduces the segment data that is temporarily stored and displays the reproduced video in a display region (Step S24). Subsequently, the smartphone 10 (the display region size specifying unit 102) specifies the size of the display region of the reproduced video (Step S25). Next, the smartphone 10 (the cache amount specifying unit 103) specifies the data amount of the segment data that is temporarily stored, in other words, the cache amount (Step S26).

Subsequently, the smartphone 10 (the communication speed specifying unit 104) specifies the communication speed in reception of the segment data (Step S27). Then, the smartphone 10 (the bit rate determining unit 105) determines a bit rate based on the size of the display region specified in Step S25, the cache amount specified in Step S26, and the communication speed specified in Step S27 (Step S28). The smartphone 10 (the delivery requesting unit 106) requests the video delivering apparatus 20 to deliver the video at the bit rate determined in Step S28 (Step S29).

The process is returned to Step S21, and the video delivering apparatus 20 (the segment data reading unit 204) reads segment data representing the video at the bit rate requested in Step S29. Thereafter, the operation of Step S21 to S29 is repeated performed until the user performs an operation of ending the playback or until the video is played back up to the end, and the playback of the video ends.

According to this exemplary embodiment, as described above, the amount of data stored in the temporary storage unit 108, in other words, the amount of data of the video, which is delivered in a streaming manner, temporarily stored is changed in accordance with the state of the own apparatus (in this exemplary embodiment, the size of the display region). For example, in the reduced state (a state in which the size of the display region is reduced) in which the bit rate is decreased, by decreasing the temporary storage amount, a playback time for which an image having low image quality (an image having a low bit rate) in a case where the size of the display region is enlarged later is shorter compared to a case where the temporarily storage amount is not decreased in the reduced state.

On the other hand, in the enlarged state (a state in which the size of the display region is enlarged) in which the bit rate is increased, the size of the segment data is also increased, and accordingly, the communication may be more easily interrupted than that of a case where the segment data is small. In this exemplary embodiment, in the enlarged state, by increasing the temporary storage amount, compared to a case where the temporary storage amount is not increased in the enlarged state, even when the communication may be easily interrupted, the interruption of the video occurs less than in a case where the temporary storage amount is not increased. In addition, since the upper limit of the temporary storage amount is set, an excessive increase in the temporary storage amount can be prevented.

[2] Modified Example

The exemplary embodiment described above is merely an example of the exemplary embodiment of the present invention and may be modified as blow. In addition, the exemplary embodiment and each modified example may be combined together as is necessary.

[2-1] Upper Limit of Temporary Storage Amount

In the exemplary embodiment, while the upper limit of the temporary storage amount is set, the upper limit may not be set. For example, in a case where the temporary storage unit 108 has a storage capacity exceeding a maximum data size of a video to be streamed, although the upper limit is not set, a case where the storage region used for temporary storage is insufficient, and delivered segment data is discarded does not occur.

[2-2] Direction of Display Apparatus

The temporary storage amount control processing unit 110 may use states other than those of the exemplary embodiment as the states of the own apparatus (display apparatus). For example, in a case where the video playback unit 109, as illustrated with reference to FIG. 6A, displays a video in a display region of a size according to the direction of the own apparatus, the temporary storage amount control processing unit 110 performs a process of configuring the temporary storage amount to be an amount according to the direction by using the state of the direction of the own apparatus as the state of the own apparatus as the storage amount control process.

Figures 10, 11, 12:
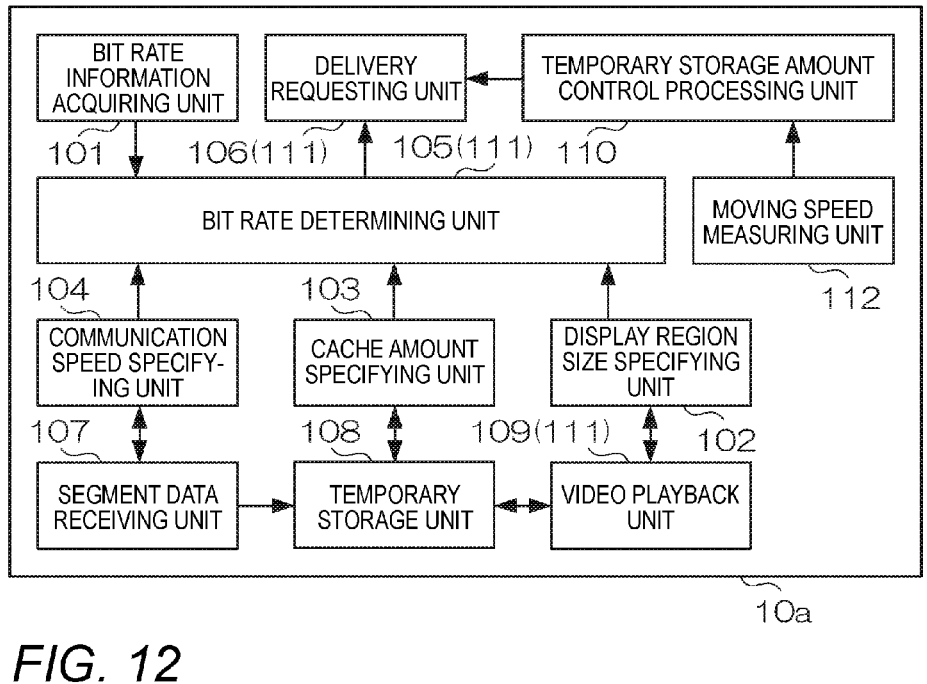
FIG. 10 is a diagram that illustrates an example of a segment data number table according to a modified example.
FIG. 11 is a diagram that illustrates the functional configuration realized by a smartphone according to a modified example.
FIG. 12 is a diagram that illustrates an example of a segment data number table.

FIG. 10 illustrates an example of a segment data number table according to this modified example. In the example illustrated in FIG. 10, it is illustrated that, in a case where the state of the direction of the own apparatus is the "horizontal direction" (a state in which the smartphone 10 is directed such that the long side 162 of the display surface 161 is disposed along the horizontal direction as illustrated in FIG. 6B), the number of pieces of segment data is "increased", and, in a case where the state of the direction of the own apparatus is the "vertical direction" (a state in which the smartphone 10 is directed such that the short side 163 of the display surface 161 is disposed along the vertical direction as illustrated in FIG. 6A), the number of pieces of segment data is "decreased".

As illustrated in this segment data number table, the temporary storage amount control processing unit 110 performs a process for increasing the temporary storage amount as the storage amount control process in a case where the smartphone 10 is in the state of the horizontal direction and performs a process for decreasing the temporary storage amount as the storage amount control process in a case where the smartphone 10 is in the state of the vertical direction. As described above, in this modified example, the amount of data of a video, which is delivered in a streaming manner, temporarily stored is varied in accordance with the direction of the smartphone 10. In this way, as presented in the description illustrated in FIG. 6A, in a case where the smartphone 10 has a larger size of the display region in the state of the horizontal direction than in the state of the vertical direction, as in the exemplary embodiment, in a case where the size of the display region is enlarged later, a time for which an image (an image having a low bit rate) of low image quality is played back is shortened, and the interruption of a video is less likely to occur.

[2-3] Moving Speed of Display Apparatus

The temporary storage amount control processing unit 110 may use a state of moving speed as the state of the own apparatus (display apparatus). In such a case, the temporary storage amount control processing unit 110 performs a process for configuring the temporary storage amount to be an amount according to the speed using the state of moving speed of the own apparatus as the state of the own apparatus as the storage amount control process.

FIG. 11 illustrates the functional configuration realized by a smartphone 10a according to this modified example. The smartphone 10a includes a moving speed measuring unit 112 in addition to the units illustrated in FIG. 5. In this modified example, the sensor 18 illustrated in FIG. 3 is a tri-axial acceleration sensor and supplies data representing the acceleration of the smartphone 10a to the CPU 11. The moving speed measuring unit 112 measures the moving speed of the smartphone 10a based on this acceleration. The moving speed measuring unit 112 performs measurement at the same interval as that of the delivery request from the delivery requesting unit 106 and supplies a result of the measurement to the temporary storage amount control processing unit 110 for each measurement.

FIG. 12 illustrates an example of a segment data number table according to this modified example. In the example illustrated in FIG. 12, it is illustrated that the number of pieces of segment data is "increased" in a case where the state of the moving speed of the smartphone 10a is less than "threshold Th11" and "decreases" the number of pieces of segment data in a case where the state of the moving speed of the smartphone 10a is the "threshold Th11" or more.

As illustrated in the segment data number table, the temporary storage amount control processing unit 110 performs a process for increasing the temporary storage amount as the storage amount control process in a case where the moving speed of the smartphone 10a is a state of being less than the threshold Th11 and performs a process for decreasing the temporary storage amount as the storage amount control process in a case where the moving speed of the smartphone 10a is a state of being equal to or more than the threshold Th11. As above, in this modified example, the amount of data of a video, which is delivered in a streaming manner, temporarily stored is changed in accordance with the moving speed of the smartphone 10a.

For example, a value (for example, about 2 to 3 km per hour) that is a boundary between a user's walking speed and the moving speed of the smartphone 10a at the time of user's stopping is set as the threshold Th11. Then, when the user stops, the number of pieces of segment data is increased, and the temporary storage amount is increased, whereby the video is not easily interrupted even when the communication is temporarily interrupted. On the other hand, when the user walks, the number of pieces of segment data is decreased, and the temporary storage amount is decreased, whereby the video may be easily interrupted when the communication is temporarily interrupted. In this way, compared to a case where the storage amount control process according to this modified example is not performed, a behavior (using a smartphone while walking) of watching the smartphone while walking is suppressed, and the video can be watched comfortably when the user stops.

[2-4] Position of Display Apparatus

The temporary storage amount control processing unit 110 may use the state of the position of the own apparatus as the state of the own apparatus (display apparatus). In such a case, the temporary storage amount control processing unit 110 performs a process for configuring the temporary storage amount to be an amount according to the position by using the state of the position of the own apparatus as the state of the own apparatus as the storage amount control process.

Figures 13, 14:
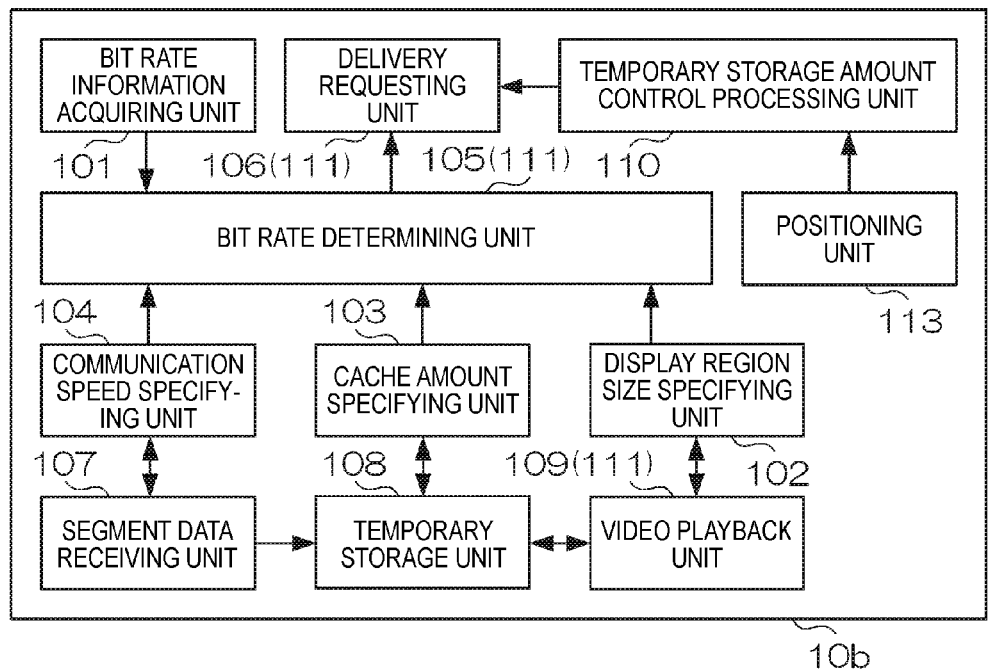
FIG. 13 is a diagram that illustrates the functional configuration realized by a smartphone according to a modified example.
FIG. 14 is a diagram that illustrates an example of a segment data number table.

FIG. 13 illustrates the functional configuration realized by a smartphone 10b according to this modified example. The smartphone 10b includes a positioning unit 113 in addition to the units illustrated in FIG. 5. In this modified example, the sensor 18 illustrated in FIG. 3 is a positioning sensor including a global positioning system (GPS) and supplies position data representing the position of the smartphone 10b to the CPU 11. The positioning unit 113 measures the position of the smartphone 10b represented by this position data. The positioning unit 113 performs measurement of the position at the same interval as that of the delivery request from the delivery requesting unit 106 and supplies a result of the measurement to the temporary storage amount control processing unit 110 for each measurement.

FIG. 14 illustrates an example of a segment data number table according to this modified example. In the example illustrated in FIG. 14, it is illustrated that the number of pieces of segment data is "increased" in a case where the state of the position of the smartphone 10b is a "house/office" and "decreases" the number of pieces of segment data in a case where the state of the position of the smartphone 10b is a movement path. In addition, it is illustrated that, in a case where the state of the position of the smartphone 10b is a "route of a train", the number of pieces of segment data is "increased" in the case of "from departure to the front of a station" and "decreases" the number of pieces of segment data in the case of "from the front of a station to departure".

As illustrated in the segment data number table, the temporary storage amount control processing unit 110 performs a process for increasing the temporary storage amount as the storage amount control process in a case where the position of the smartphone 10b is in the state of the "house/office" or in the state of "from departure to the front of a station" in a "route of a train" and performs a process for decreasing the temporary storage amount as the storage amount control process in a case where the position of the smartphone 10b is in the state of a "movement path" or in the state of "from front of a station to departure" in a "route of a train". As above, in this modified example, the amount of data of a video, which is delivered in a streaming manner, temporarily stored is changed in accordance with the position of the smartphone 10b.

In this modified example, when the user is at his house or office or is in a train, the number of pieces of segment data is increased, and the temporary storage amount is also increased, whereby the video is not easily interrupted even in a case where the communication is temporarily interrupted. On the other hand, when the user is in a movement path or when a train will be arrived at the station soon, the number of pieces of segment data is decreased, and the temporary storage amount is decreased, whereby the video may be easily interrupted when the communication is temporarily stopped. In this way, compared to a case where the storage amount control process according to this modified example is not performed, a behavior (using a smartphone while walking) of watching the smartphone while waking is suppressed. In addition, also in a case where the user moves, the video can be watched comfortably in the case of moving in a train. The moving is not limited to moving in a train, but also in the case of moving in a bus, a ship, or an airplane, as in this modified example, by performing the storage amount control process, a video can be comfortably watched.

[2-5] State of Connection Between Display Apparatus and Other Apparatus

The temporary storage amount control processing unit 110 may perform a process for configuring the temporary storage amount to be an amount according to a connection using a connection state between the own apparatus (display apparatus) and the other apparatus as the state of the own apparatus as the storage amount control process. The connection state described here, for example, is a state of a connection with an apparatus wirelessly communicating with the own apparatus.

Figure 15:
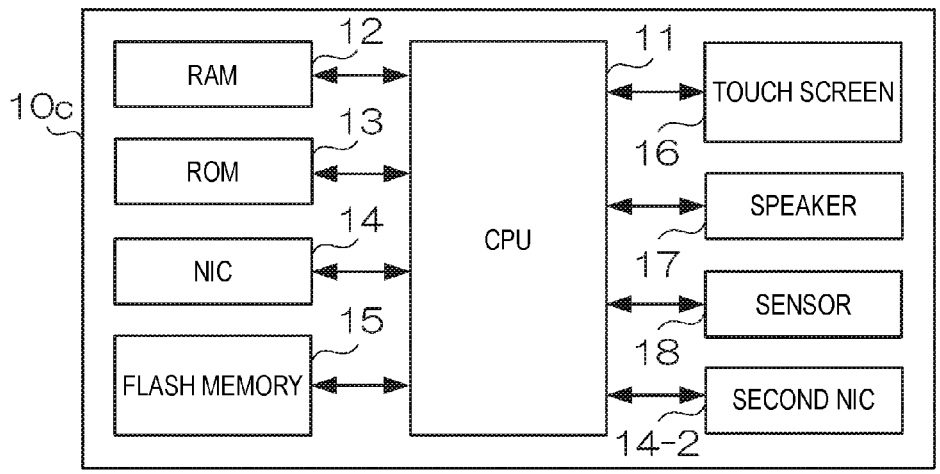
FIG. 15 is a diagram that illustrates the hardware configuration of a smartphone according to a modified example.

FIG. 15 illustrates the hardware configuration of a smartphone 10c according to this modified example. The smartphone 10c includes a second NIC 14-2 in addition to the hardware illustrated in FIG. 3. In this modified example, the NIC 14 performs radio communication compliant with a mobile communication standard, and the second NIC 14-2 performs radio communication compliant with a standard of a wireless local area network (LAN).

Figure 16:
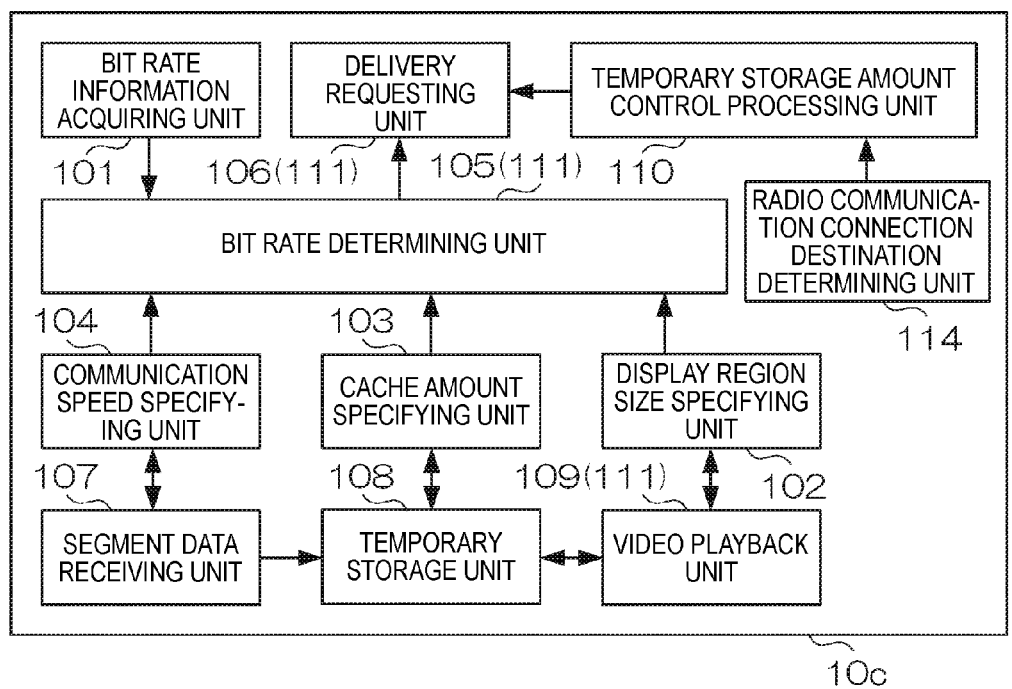
FIG. 16 is a diagram that illustrates the functional configuration realized by a smartphone.

FIG. 16 illustrates the functional configuration realized by the smartphone 10c. The smartphone 10c includes a radio communication connection destination determining unit 114 in addition to the units illustrated in FIG. 5. The radio communication connection destination determining unit 114 determines a base station of a mobile communication network as a connection destination of radio communication in a case where the NIC 14 performs radio communication and determines an access point of a wireless LAN as a connection destination of radio communication in a case where the second NIC 14-2 performs radio communication. The radio communication connection destination determining unit 114 performs a determination at the same interval as that of the delivery request from the delivery requesting unit 106 and supplies a result of the determination to the temporary storage amount control processing unit 110 for each determination.

Figures 17, 18:
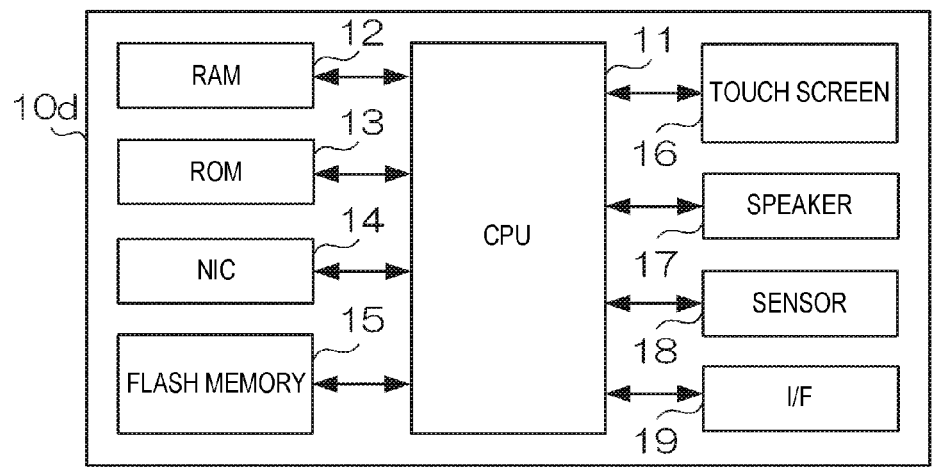
FIG. 17 is a diagram that illustrates an example of a segment data number table.
FIG. 18 is a diagram that illustrates the hardware configuration of a smartphone according to a modified example.

FIG. 17 illustrates an example of a segment data number table according to this modified example. In the example illustrated in FIG. 17, it is illustrated that the number of pieces of segment data is "increased" in a case where the connection destination of the radio communication is the "access point" and "decreases" the number of pieces of segment data in a case where the connection destination of the radio communication is the "base station". The temporary storage amount control processing unit 110, as represented by this segment data number table, the temporary storage amount control processing unit 110 performs a process for increasing the temporary storage amount in a state in which the connection destination performing the radio communication with the smartphone 10c is the "access point" as the storage amount control process and performs a process for decreasing the temporary storage amount in a state in which the connection destination performing the radio communication with the smartphone 10c is the "base station" as the storage amount control process.

As described above, in this modified example, the amount of data of a video, which is delivered in a streaming manner, temporarily stored is changed in accordance with the connection state between the smartphone 10c and the other apparatus. In addition, in a case where the access point is the connection destination, generally, meter-rate billing is not performed in a case where the access point is the connection destination, compared to a case where the storage amount control process according to this modified example is not performed, the video is not easily interrupted by increasing the temporary storage amount. On the other hand, in a case where the base station is the connection destination, since there are cases where meter-rate billing is performed, or a measure for decreasing the communication speed is performed in the case of exceeding a predetermined communication amount, compared to a case where the storage amount control process according to this modified example is not performed, by decreasing the temporary storage amount, a decrease in the communication charge or avoidance of the measure for decreasing the communication speed can be easily performed.

Here, the connection state, for example, may be a connection state between the own apparatus (display apparatus) and a peripheral other than that described above.

FIG. 18 illustrates the hardware configuration of a smartphone 10d according to a modified example. The smartphone 10d includes an interface (I/F) 19 in addition to the hardware illustrated in FIG. 3. The I/F 19, for example, is an interface compliance with a standard of Bluetooth (registered trademark), and peripherals corresponding to Bluetooth are connected thereto.

Figures 19, 20:
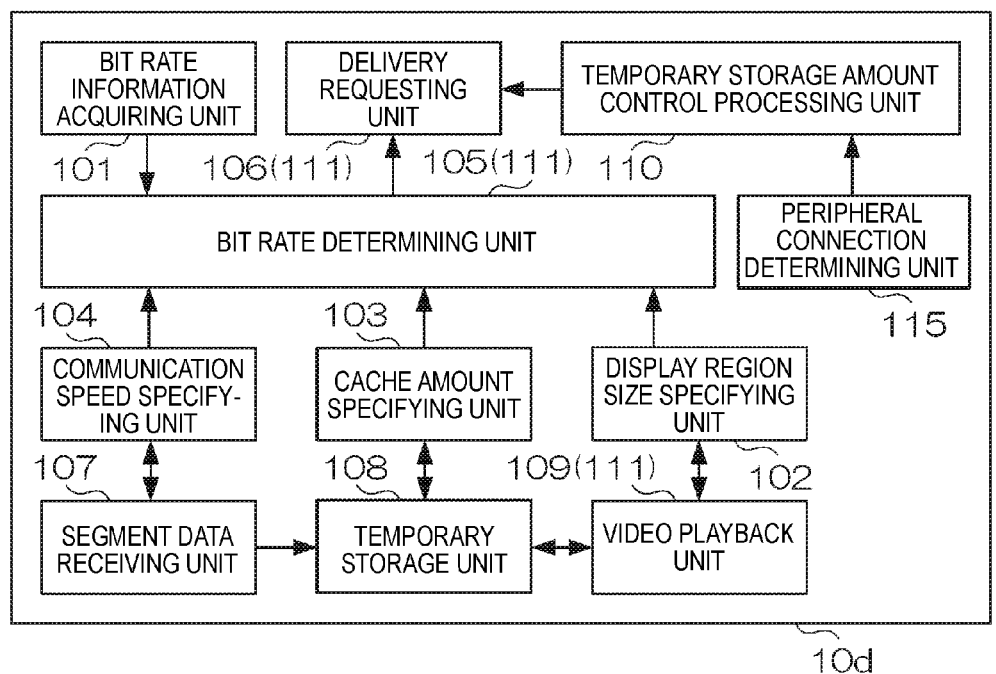
FIG. 19 is a diagram that illustrates the functional configuration realized by a smartphone.
FIG. 20 is a diagram that illustrates an example of a segment data number table.

FIG. 19 illustrates the functional configuration realized by the smartphone 10d. The smartphone 10d includes a peripheral connection determining unit 115 in addition to the units illustrated in FIG. 5. The peripheral connection determining unit 115 determines presence/absence of a peripheral connected to the I/F 19. The peripheral connection determining unit 115, for example, acquires information representing a pairing state of Bluetooth from an operating system (OS) of the smartphone 10d and, in a case where a paired apparatus is present, determines that a peripheral is connected. The peripheral connection determining unit 115 performs a determination at the same interval as that of the delivery request from the delivery requesting unit 106 and supplies a result of the determination to the temporary storage amount control processing unit 110 for each determination.

FIG. 20 illustrates an example of a segment data number table according to this modified example. In the example illustrated in FIG. 20, it is illustrated that the number of pieces of segment data is "increased" in a case where the connection of a peripheral is "absence" and "decreases" the number of pieces of segment data in a case where the connection of a peripheral is "presence". As illustrated in this segment data number table, the temporary storage amount control processing unit 110 performs a process for increasing the temporary storage amount as the storage amount control process in a state in which a connection between the smartphone 10d and the peripheral is absent and performs a process for decreasing the temporary storage amount as the storage amount control process in a state in which a connection between the smartphone 10d and a peripheral is present.

Also in this case, the amount of data of a video, which is delivered in a streaming manner, temporarily stored is changed in accordance with a connection state between the smartphone 10d and the other apparatus. In a case where a peripheral is connected, a state of mainly using the peripheral is formed, and accordingly, in this modified example, a storage region that can be used by the peripheral is configured to be large by decreasing the temporary storage amount. Meanwhile, in a case where a peripheral is connected, compared to a case where no peripheral is connected, attention to a displayed video may be relatively easily lowered, and accordingly, the influence at the time of decreasing the temporary storage amount is small.

[2-6] Server Apparatus

The determination of a bit rate described above may be performed by a server apparatus.

Figure 21:
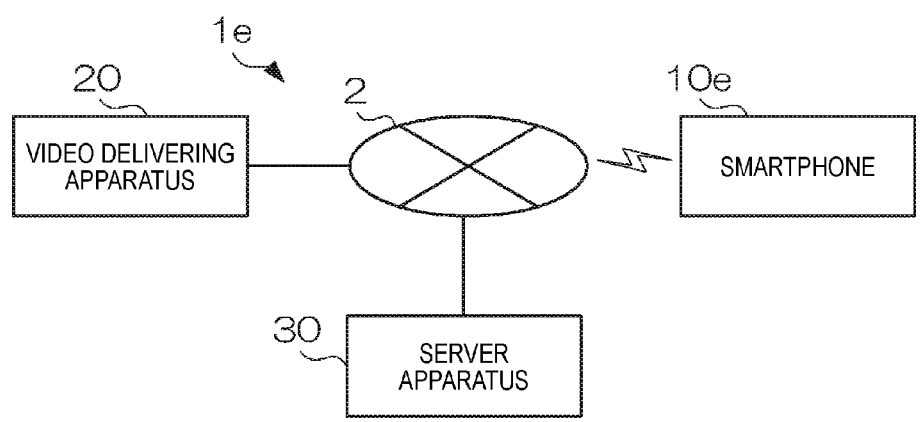
FIG. 21 is a diagram that illustrates the whole configuration of a video delivery system according to a modified example.

FIG. 21 illustrates the whole configuration of a video delivery system 1e according to this modified example. The video delivery system 1e includes: a communication line 2; a smartphone 10e; a video delivering apparatus 20; and a server apparatus 30.

Figure 22:
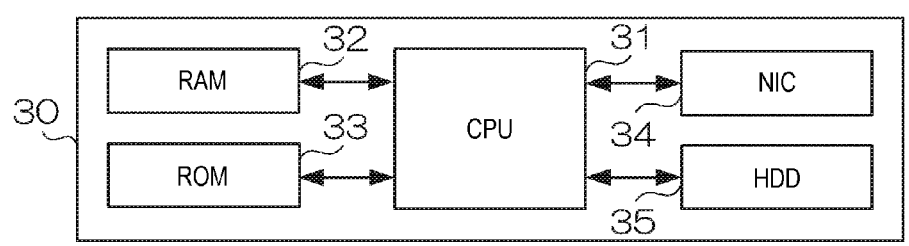
FIG. 22 is a diagram that illustrates the hardware configuration of a server apparatus.

FIG. 22 is a diagram that illustrates the hardware configuration of the server apparatus 30. The server apparatus 30 is a computer that includes a CPU 31, a RAM 32, a ROM 33, an NIC 34, and an HDD 35. From the CPU 31 to the HDD 35 are common to hardware of the same names illustrated in FIG. 4.

Figure 23:
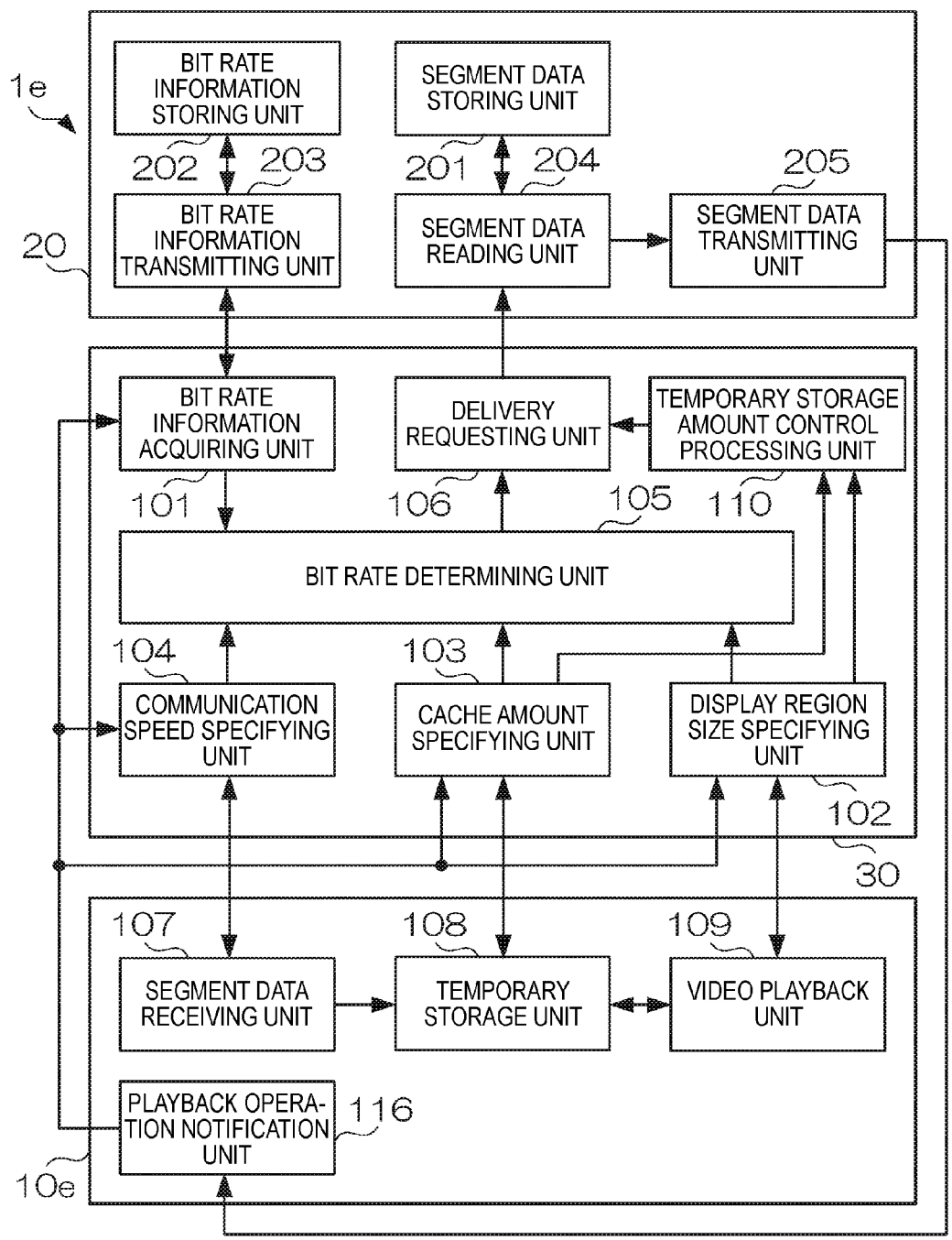
FIG. 23 is a diagram that illustrates the functional configuration realized by each apparatus.

FIG. 23 illustrates the functional configuration realized by each apparatus according to this modified example. The smartphone 10e includes a playback operation notification unit 116 in addition to the segment data receiving unit 107, the temporary storage unit 108, and the video playback unit 109 illustrated in FIG. 5. The server apparatus 30 includes: the bit rate information acquiring unit 101; the display region size specifying unit 102; the cache amount specifying unit 103; the communication speed specifying unit 104; the bit rate determining unit 105; the delivery requesting unit 106; and the temporary storage amount control processing unit 110 illustrated in FIG. 5.

When an operation of playing a video delivered in a streaming manner is performed for the smartphone 10e, the playback operation notification unit 116 of the smartphone 10e notifies the server apparatus 30 of an indication thereof. This notification is received by the bit rate information acquiring unit 101, the display region size specifying unit 102, the cache amount specifying unit 103, and the communication speed specifying unit 104 of the server apparatus 30. When this notification is received and the bit rate information acquiring unit 101 acquires bit rate information, and each specifying unit communicates with each unit corresponding to the smartphone 10e (the display region size specifying unit 102 communicates with the video playback unit 109, the cache amount specifying unit 103 communicates with the temporary storage unit 108, and the communication speed specifying unit 104 communicates with the segment data receiving unit 107) and starts a specific operation thereof.

The temporary storage amount control processing unit 110 according to this modified example performs a storage amount control process for configuring the temporary storage amount of a video in a display apparatus (in this modified example, the smartphone 10e) displaying data of a video delivered in a streaming manner while temporarily storing the data to be an amount according to the state of the display apparatus. This temporary storage amount control processing unit 110 is also an example of a "processing unit" according to the present invention. The temporary storage amount control processing unit 110, for example, by using the state of the size of the display region in which the smartphone 10e displays the video as the state of the display apparatus, performs a process for configuring the temporary storage amount to be an amount according to the size as the storage amount control process.

While details of the storage amount control process are common to the exemplary embodiment or the modified examples described above, in each of the examples described, the display apparatus performs the storage amount control process, and accordingly, mainly, the own apparatus is a target or a subject of the process. However, in this modified example, since the server apparatus 30 performs the storage amount control process, not the "own apparatus" but the "display apparatus" that is an external apparatus of the server apparatus 30 is a target or a subject of the process. Accordingly, as in each of the examples described above, the bit rate determining unit 105 determines the bit rate, the temporary storage amount control processing unit 110 determines the number of pieces of segment data, and the delivery of a video is requested by the delivery requesting unit 106.

At this time, the delivery requesting unit 106 performs a request with a delivery destination of the video set as the smartphone 10e. The segment data transmitting unit 205 of the video delivering apparatus 20 transmits segment data of the requested video to the smartphone 10e. In this way, the video of the bit rate determined by the server apparatus 30 is delivered to the smartphone 10e. Also in this modified example, since the server apparatus 30 as the smartphone 10 according to the exemplary embodiment controls the temporary storage amount, the amount of the data of the video, which is delivered in a streaming manner, temporarily stored is changed according to the state (in this modified example, the size of the display region) of the smartphone 10.

[2-7] Category of Invention

The present invention is perceived as a video delivering apparatus or a video delivery system including such as an apparatus other than the display apparatus displaying a video that is delivered in a streaming manner like the smartphone described above and an information processing apparatus performing the storage amount control process without displaying the video like the server apparatus described above. In addition, the present invention is perceived also as an information processing method for realizing the process performed by each apparatus or a program for causing a computer controlling each apparatus to function. Such a program may be provided in a form of a non-transitory recording medium such as an optical disk storing the program thereon, in a form of being downloaded to a computer through a communication line such as the Internet and being installed thereto so as to be usable, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
   a temporary storage unit that temporarily stores data of a video that is delivered in a streaming manner, the video having a variable bit rate during display;
   a display unit that displays the video while reading the data that is temporarily stored and varies the bit rate of the video according to a size of a display region in which the video is displayed; and a processing unit that performs a storage amount control process such that a temporary storage amount of the data of the video stored in the temporary storage unit is an amount according to the size of the display region displaying the video.

2. The display apparatus according to claim 1, wherein:

the display unit varies the bit rate to a large value in a case where the display region is enlarged, and the processing unit performs the storage amount control process by increasing the temporary storage amount in a case where the size of the display region is enlarged.

3. The display apparatus according to claim 2, wherein an upper limit is set on the amount of the data temporarily stored in the temporary storage unit, and the processing unit performs the storage amount control process for increasing the temporary storage amount in a range up to the upper limit.

4. The display apparatus according to claim 1, wherein the display unit varies the bit rate to a small value in a case where the display region is reduced, and the processing unit performs the storage amount control process by decreasing the temporary storage amount in a case where the size of the display region is reduced.

5. A display apparatus comprising:

a temporary storage unit that temporarily stores data of a video that is delivered in a streaming manner;

a display unit that displays the video while reading the data that is temporarily stored; and a processing unit that performs a storage amount control process such that a temporary storage amount of the data of the video stored in the temporary storage unit is an amount according to a connection state of the display apparatus to another apparatus.

* * * * *